US011461819B2

(12) United States Patent
Choche et al.

(10) Patent No.: US 11,461,819 B2
(45) Date of Patent: Oct. 4, 2022

(54) CUSTOM DIGITAL FILES FOR GARMENT PRODUCTION

(71) Applicant: Amazon Technologies, Inc., Seattle, WA (US)

(72) Inventors: Akshay Vivek Choche, Seattle, WA (US); Nancy Yi Liang, Seattle, WA (US); Nikita Jain, Seattle, WA (US); Palvali Teja Burugu, Seattle, WA (US); Juthika Das, Seattle, WA (US); Matthew Keith Miller, Seattle, WA (US); Li Yang, Seattle, WA (US); Shini Arora, Seattle, WA (US); Xiaowen Ding, Seattle, WA (US); Jennifer Lin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 16/906,749

(22) Filed: Jun. 19, 2020

(65) Prior Publication Data
US 2020/0402126 A1 Dec. 24, 2020

Related U.S. Application Data

(63) Continuation-in-part of application No. 16/450,843, filed on Jun. 24, 2019, now Pat. No. 11,112,772, and
(Continued)

(51) Int. Cl.
*G06Q 30/06* (2012.01)
*G06T 19/20* (2011.01)

(52) U.S. Cl.
CPC ..... *G06Q 30/0621* (2013.01); *G06Q 30/0643* (2013.01); *G06T 19/20* (2013.01)

(58) Field of Classification Search
CPC ............ G06Q 30/0621; G06Q 30/0643; G06T 19/20; A41H 3/007; A41H 3/04
(Continued)

(56) References Cited

U.S. PATENT DOCUMENTS 8,813,378 B2 * 8/2014 Grove ...................... A41H 3/00
33/17 R
11,112,772 B2 9/2021 Choche et al.
(Continued)

FOREIGN PATENT DOCUMENTS

WO   WO 2020/263701   12/2020
WO   WO 2020/263705   12/2020

OTHER PUBLICATIONS

International Search Report and Written Opinion for International Application No. PCT/US2020/038676. Notification dated Jul. 30, 2020.
(Continued)

*Primary Examiner* — Nathan E Durham
(74) *Attorney, Agent, or Firm* — Knobbe, Martens, Olson & Bear, LLP

(57) ABSTRACT

Methods and systems are provided to customize a base digital file for a garment according to a user's body measurements and generate a custom digital file for the garment, which may be used in garment production. For example, a system may receive a request to generate a custom-fit garment, customization options, and information regarding a customer's body measurements, retrieve a base digital file for the garment, identify points and edges in the base digital file of the garment, adjust the points and edges according to defined equations that take into account the user's body measurements, generate a custom digital file for the garment, and display a visual representation of the customized garment.

18 Claims, 15 Drawing Sheets

Related U.S. Application Data a continuation-in-part of application No. 16/450,877, filed on Jun. 24, 2019.

(58) Field of Classification Search
USPC .......................................................... 700/132
See application file for complete search history.

(56) References Cited

U.S. PATENT DOCUMENTS

| | | | |
|---|---|---|---|
| 2009/0222127 A1* | 9/2009 | Lind | ................... G06Q 30/0601 705/26.1 |
| 2009/0248193 A1 | 10/2009 | Basheer et al. | |
| 2014/0277683 A1* | 9/2014 | Gupta | ..................... G06F 30/00 700/132 |
| 2017/0046769 A1 | 2/2017 | Jackson et al. | |
| 2020/0397080 A1 | 12/2020 | Choche et al. | |

OTHER PUBLICATIONS

International Search Report and Written Opinion for International Application No. PCT/US2020/038721. Notification dated Aug. 3, 2020.

PRNewswire, "OnPoint Manufacturing Announces Launch of Unique. Fashion in Collaboration With the Fashion Institute of Technology's FIT/Infor DTech Lab," Mar. 29, 2019, available at https://www.prnewswire.com/news-releases/onpoint-manufacturing-announces-launch-of-uniquefashion-in-collaboration-with-the-fashion-institute-of-technologys-fitinfor-dtech-lab-300821227.html.

Kochar, Saral, "What is a Tech Pack?," Jan. 31, 2019, available at https://techpacker.com/blog/design/what-is-a-techpack/.

* cited by examiner

```
{
    "$schema": "schema#",
    "$id": "garment.json",
    "title": "Garment",
    "description": "An object representing a garment.",
    "type": "object",
    "properties": {
        "garment_id": {
            "description": "An UUID which can be used to reference this object inside other releated schemas like stitching.",
            "type": "string",
            "pattern": "^[0-9a-f]{8}-[0-9a-f]{4}-[0-9a-f]{4}-[0-9a-f]{4}-[0-9a-f]{12}$"
        },
        "version": {
            "description": "A schema version",
            "type": "string"
        },                                                    ← 610
        "panels": {
            "type": "array",
            "description": "A set of panels used to construct this garment.",
            "items": {
                "$ref": "panel.json"
            }
        },                                                    ← 614
        "notions": {
            "type": "array",
            "description": "A set of notions to be used to construct this garment.",   ← 618
            "items": {
                "anyOf": [
                    {"$ref": "thread.json"},
                    {"$ref": "collar.json"},
                    {"$ref": "embroidery.json"},
                    {"$ref": "standardlabel.json"},
                    {"$ref": "customlabel.json"},
                ]
            }
        }
    },
    "required": [garment_id", "version", "panels", "notions"]
}
```

FIG. 6

```
{
    "$schema": "schema#",
    "$id": "panel.json",
    "title": "Panel",
    "description": "An object representing a panel of a garment.",
    "type": "object",
    "properties": {
        "panel_id": {
            "description: "An UUID which can be used to reference a panel.",
            "type": "string",
            "pattern": "^[0-9a-f]{8}-[0-9a-f]{4}-[0-9a-f]{4}-[0-9a-f]{4}-[0-9a-f]{12}$"
        },
        "panel_annotation": {
            "description": "A list of annotation properties to be added to the Panel specification",
            "type": "array"
            "items": {
                "type": "object",
                "properties": {
                    "key": {
                        "type": "string",
                        "description": "A key for the annotation, such as description"
                    },
                    "value": {
                        "type": "string",
                        "description": "A value for the annotation, such as description text"
                    }
                },
                "required": ["key", "value"],
            }
        },
        "fabric_id": {
            "description": "This id is used for identifying what fabric this panel is made off",
            "type": "string"
        },   ← 710
        "seams": {
            "description": "This id is used for identifying what fabric this panel is made off",
            "type": "string"
            "items": {"$ref": "seam.json"}
        }
    },
    "required": [garment_id", "version", "panels", "notions"]
}
```

FIG. 7

```
{
    "$schema": "schema#",
    "$id": "seam.json",
    "title": "Seam",
    "description": "An object representing a seam for a panel. A seam is a set of edges of same or different type.",
    "type": "object",
    "properties": {
        "seam_id": {
            "description": "An UUID used to reference a seam.",
            "type": "string",
            "pattern": "^[0-9a-f]{8}-[0-9a-f]{4}-[0-9a-f]{4}-[0-9a-f]{4}-[0-9a-f]{12}$"
        },
        "seam_allowance": {
            "description": "Seam allowance to be used along this seam",
            "$ref": "measurement.json"
        },
        "edges": {
            "type": "array",
            "items": {
                "anyOf": [
                    {"$ref": "cubic_bezier.json"},
                    {"$ref": "bezier.json"},
                    {"$ref": "line.json"},
                ]
            }
        }
    },
    "required": ["seam_id", "edges"]
}
```

- 810 → "seam_id"
- 820 → "seam_allowance"
- 830 → "edges"

FIG. 8

CUSTOM DIGITAL FILES FOR GARMENT PRODUCTION

CROSS-REFERENCE TO RELATED APPLICATIONS

This application is a continuation-in-part of both U.S. patent application Ser. No. 16/450,877, filed Jun. 24, 2019, titled "GENERATING DIGITAL FILES FOR GARMENT PRODUCTION," and U.S. patent application Ser. No. 16/450,843, filed Jun. 24, 2019, titled "DIGITAL FILE STRUCTURE FOR GARMENT PRODUCTION," each of which is hereby incorporated by reference in its entirety herein.

BACKGROUND

A user may wish to use standards to effectively communicate ideas or instructions in a way that is readily understood by a recipient. For example, a clothing designer may use specific terminology, drawings, or labels to dictate how an article of clothing should be manufactured. However, in many clothing design situations, individual designers may use different wordings, formatting or methods to convey instructions, such that manufacturers often have to ask for clarification regarding the designer's instructions in order to create a document with the content and/or formatting that the manufacturer desires for actual production of a garment. To provide clarification for each and every set of instructions for each and every article of clothing would be prohibitively expensive in terms of labor, time, and cost, and introduces increasing levels of complexity and potential scaling problems as clothing lines increase in size and variety.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 6 is example text for an example garment object utilized in a digital file system, according to some embodiments.

FIG. 7 is example text for an example panel object utilized in a digital file system, according to some embodiments.

FIG. 8 is an example text for an example seam object utilized in a digital file system, according to some embodiments.

DETAILED DESCRIPTION

Figure 1:
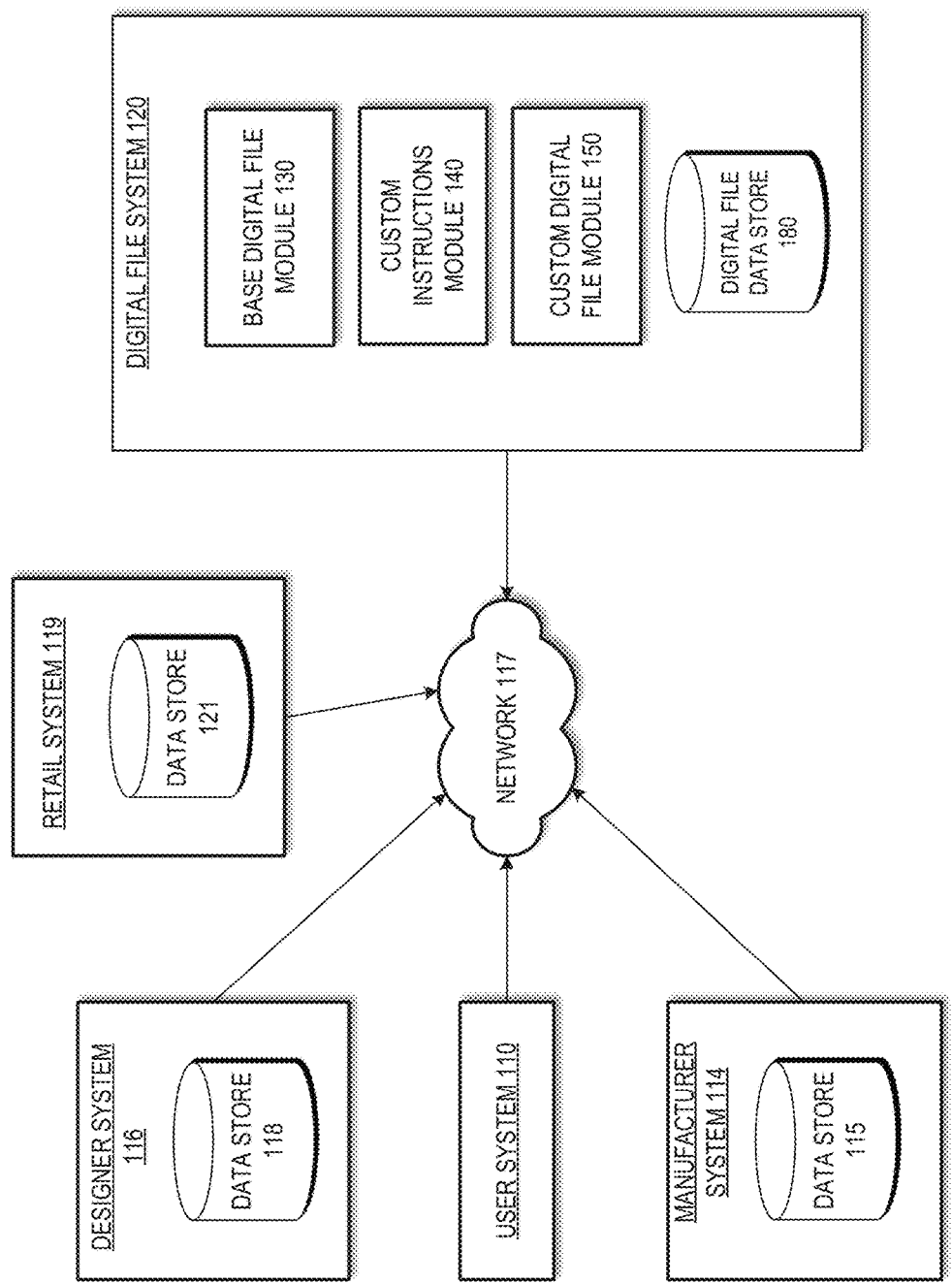
FIG. 1 is an illustrative networked environment and system architecture of a digital file system that may be used in association with garment production, according to some embodiments.

Aspects of the present disclosure relate to utilizing a digital file system to provide complete manufacturing instructions for any sort of garment via a digital file. Providing a digital file for manufacturing clothing may be accomplished in different manners, such as using different algorithms and/or different methodologies, as will be further described below.

As will be described herein, a digital file system may receive a set of information, documents, or selections for a first size of an item or garment, generate a digital file specific to the item in the first size, and store the digital file. The digital file system may then receive a user input comprising individual body measurements or a selection of a standard size of the garment, and generate a custom digital file by applying individual body measurements or a standard size grading rubric to the digital file. As will further be discussed below, the digital file system may divide the method and processes among various modules or system components.

The task of generating instructions to manufacture garments according to previously used methods typically involves generating a tech pack, where the tech pack typically comprises a specification sheet for a base size of a garment and a grading sheet which is used for transforming the base size into any other standard sizes (e.g., small, medium, and large). While there is some automation done where a designer shares a file (e.g., a digital exchange file), there are no semantics associated with the data in the file to help interpret coordinates in the file. Therefore, two different manufacturers may interpret the same tech pack differently if the two manufacturers each use different software (e.g., LibreCAD, AutoCAD) to analyze the received file. Furthermore, existing use of tech packs is not reliable when making made-to-measure clothing since no rule set is present when making customized clothing.

Furthermore, the task of ensuring that each tech pack is properly understood can be burdensome and time consuming for both manufacturers and designers, especially if the manufacturers need to repeatedly ask for clarification for each particular article of clothing. Typically, a designer will provide detailed instructions to a manufacturer to produce an article of clothing. Typically, however, the designer may use informal drawings, scribbles, or writing when conveying instructions in a traditional tech pack. Furthermore, while some designers may use a computer to help generate a tech pack, designers commonly submit informal instructions scribbled using pen and paper. Therefore, a designer's intent may not be effectively conveyed to the manufacturer due to a lack of understanding or insufficient detail. Further, in many cases, traditional tech packs do not allow a manufacturer to easily measure changes to an article of clothing if the article of clothing deviates from the size initially contemplated by the tech pack. Thus, the manufacturer or designer frequently has to manually check and add instructions when manufacturing an article of clothing.

Digital file methods and systems disclosed herein address these problems, allowing a system to generate a digital file to automatically consolidate instructions in a standardized digital format, which may be interpretable by both a human reader and a computer. For example, in some embodiments described herein, the digital file system may receive a user input comprising information associated with a first size of an item, generate a digital file for the item in the first size, store the digital file, receive individual body measurements or a standard size selection, and generate a custom digital file by applying individual body measurements or a standard size grading to various parameters within the digital file in a manner that creates set results that are not dependent on human guesswork.

There are many technical and practical benefits to utilizing the digital file system and methods described herein. By grouping various instructions into different specification objects within the digital file, the specification objects may tackle different parts of garment construction and can be pieced together to support different use cases. Furthermore, by using discrete objects to describe different instructions, it is possible to easily add additional variations to the digital file quickly and efficiently depending on the requirements of the particular article of clothing. In contrast, other methods may need to manually generate tech packs for each possible combination of features in a garment. By improving the ability to generate standardized digital files with instructions, the techniques described herein significantly reduce the inefficiencies of various types of garment construction, enabling production of garments in fewer steps and at scale.

FIG. 1 is an illustrative networked environment and system architecture of a digital file system, according to some embodiments. The illustrative environment includes a user system 110, a manufacturer system 114, a designer system 116, a retail system 119, a network 117, and a digital file system 120. In some embodiments, user system 110 may be a computer, handheld mobile computing device, or other computing system. In some embodiments, the user system 110 may comprise a processor configured to execute instructions to generate a user interface and transmit user input to digital file system 120.

In some embodiments, designer system 116 may be a computer, handheld mobile computing device, or other computing system utilized by a clothing designer to submit information regarding a garment to digital file system 120. In some embodiments, designer system 116 may comprise a data store 118 configured to store a plurality of garment information files as data entries.

In some embodiments, retail system 119 may be connected to, or in communication with, a data store 121 that stores item information regarding a number of items, such as items listed in an electronic catalog as available for browse and/or purchase via the retail system or service. Item data stored in data store 121 may include any information related to each item. For example, item data may include, but is not limited to, price, availability, title, item identifier, item feedback (e.g., user reviews, ratings, etc.), item image, item description, item attributes, keywords associated with the item, etc. In some embodiments, the data store 121 may store digital content items (e.g., audiobooks, electronic books, music, movies, etc.). In some embodiments, the retail system 119 may also be connected to, or in communication with, a user data store (not illustrated) that stores user data associated with users of the retail service, such as purchase history, browsing history, item reviews and ratings, personal information, user preferences, location information, body measurements, activity information, etc.

In some embodiments, manufacturer system 114 may be a computer, handheld mobile computing device, or other computing system utilized by a manufacturer to receive a digital file from digital file system 120. The manufacturer system 114 may then be utilized by manufacturing personnel and/or machines in producing a garment according to the digital file. In some embodiments, manufacturer system 114 may comprise a data store 115 configured to store a digital file as an entry.

It will be appreciated that any number of user systems 110, designer systems 116, retail systems 119 and manufacturer systems 114 may be utilized in the digital file system environment. In some embodiments, user system 110, manufacturer system 114, and designer system 116, retail system 119, and digital file system 120 may communicate with each other over a network 117, such as the Internet. As will be discussed in greater detail, in some embodiments, digital file system 120 may be in communication with user system 110, designer system 116, and manufacturer system 114 to generate and transmit one or more digital files. In some embodiments, digital file system 120 may comprise a base digital file module 130, a custom instructions module 140, a custom digital file module 150, and a digital file data store 180.

In some embodiments the digital file system 120 may utilize base digital file module 130 to generate a base digital file for a particular garment. As will be discussed below, in some embodiments, base digital file module 130 may receive information from designer system 116 regarding creating an article of clothing in a base size. In some embodiments, the base digital file module may receive the information, convert or otherwise process it, and divide it into components of a base digital file.

In some embodiments, the custom instructions module 140 may receive a user input from user system 110. For example, in some embodiments, a user may interact with a user interface associated with the retail system 119 to browse through an electronic catalog of items and to select an option to purchase a garment in a standard size. In some embodiments, the user may input, via the user interface, custom body measurements, which may be stored in data store 121. The retail system 119 may then forward the user custom body measurements to digital file system 120.

In some embodiments, the digital file system 120 may utilize custom digital file module 150 to generate a custom digital file. In some embodiments, the custom digital file module 150 may generate a custom digital file for an article of clothing based at least partly on the received custom instructions and the base digital file of the particular article of clothing. For example, the digital file system 120 may receive a request to purchase a first shirt in a standard large size, and the custom digital file module 150 may retrieve a base digital file from the digital file data store 180 corresponding to the first shirt, and apply a grading scale to transform the first shirt into the appropriate large size, assuming that the base digital file is not of the first shirt in a large size. The generated custom digital file may be stored in digital file data store 180 to be accessed or transmitted over network 117.

Figure 2:
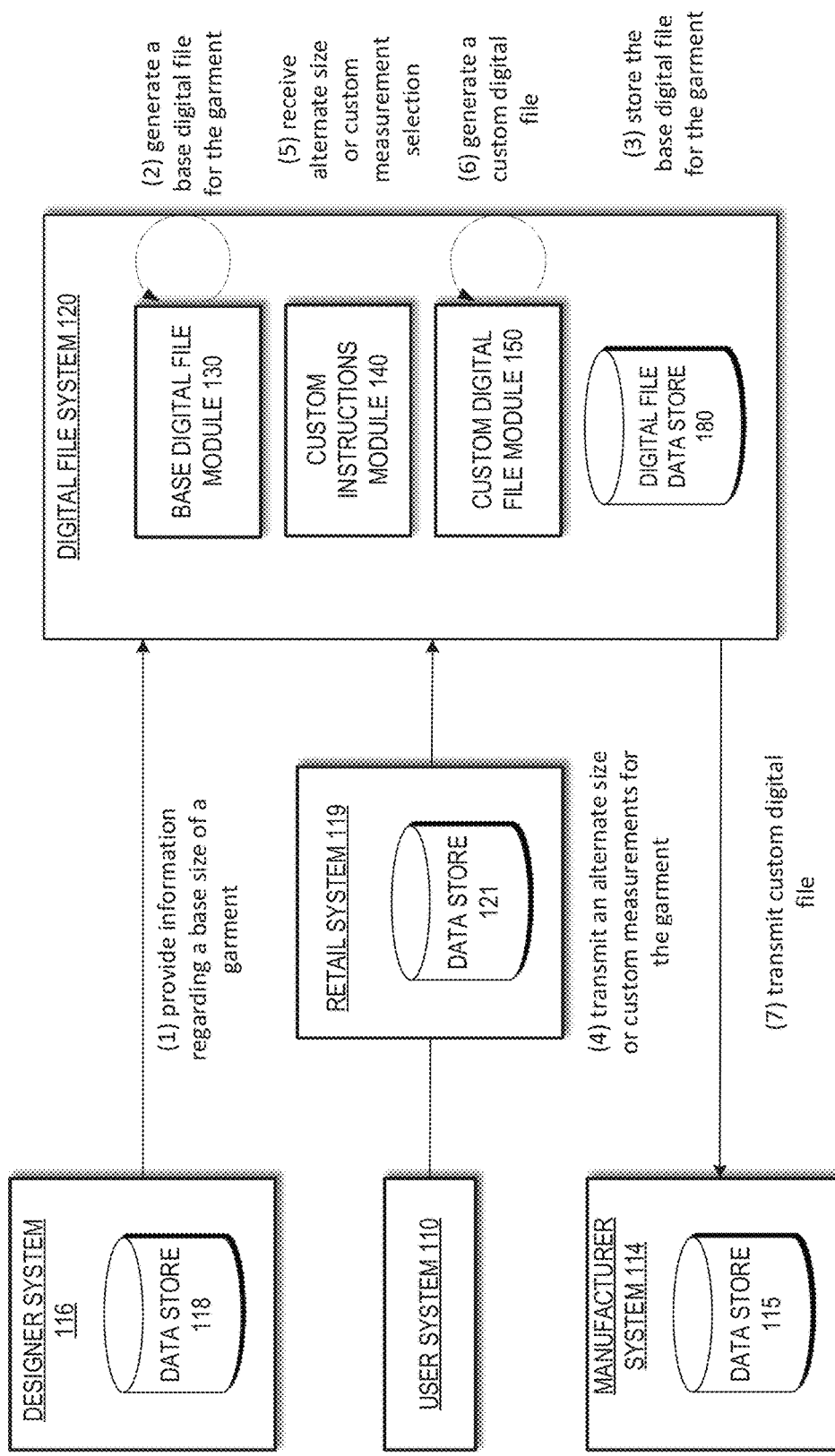
FIG. 2 is a data flow diagram depicting an example method of the digital file system for generating base digital files and custom digital files for use in garment production, according to some embodiments.

FIG. 2 is a data flow diagram depicting an example method of the digital file system that may be used in association with garment production, according to some embodiments. As part of the digital file method, designer system 116 may (1) provide information regarding a first size of a garment. For example, a designer may submit a drawing exchange format (dxf) file or a scalable vector graphics (svg) file depicting a garment in a first size (e.g., a garment in a medium size). In some embodiments, a clothing designer may provide information via a user interface associated with the digital file system 120. For example, a user interface may prompt the designer to draw a shape representing a panel of a garment. The designer may utilize the user interface to click on specific panels, reshape panels, select a seam to use on a particular panel via a drop-down menu, draw connections between panels, select a type of fabric to use when manufacturing a panel or garment, edit and view a specific panel, mark specific locations where embroidery should appear in a garment, etc.

The digital file system 120 may (2) generate a base digital file for the garment in the first size. In some embodiments, the digital file system 120 may divide the garment into a plurality of components. For example, the digital file system 120 may receive information regarding a specific garment (e.g., a shirt) and may generate a plurality of panel objects to represent the components of the shirt. For example, the digital file system 120 may generate a front shirt panel object and a back shirt panel object to represent the front of the shirt and the back of the shirt respectively. As mentioned above, in some embodiments the digital file system 120 may generate a base digital file by receiving and processing the information that is selected or inputted by the designer via a user interface associated with the digital file system 120. In some embodiments, the base digital file may define a plurality of objects that each represent physical components used in production of a garment. In some embodiments, each panel of a garment may be associated with a number of attributes. For example, a front panel of a shirt may be associated with a unique panel identifier to identify that particular panel in the garment as well as a fabric identifier to represent the type of fabric to be used for constructing the front shirt panel. Advantageously, a unique panel identifier may allow a manufacturer to easily and efficiently determine the proper location of a panel to be stitched or sewed in an article of clothing.

As will be discussed below, each of a number of different components of the base digital file may refer to one or more other components of the base digital file. For example, a base digital file of a shirt may comprise a front shirt panel object and a back shirt panel object connected by a seam object representing a sewed connection between the front shirt panel object and the back shirt panel object. In some embodiments, a panel object may also be associated with panel metadata. For example, a panel object may be associated with panel annotations, a mirror line along the panel indicating symmetric areas of the panel, a fold line indicating where a panel needs to be folded, and a grain line indicating a correct orientation to place the panel on a fabric. For example, panel metadata for a panel to be used for the sleeves of a shirt may contain a key value "panel type" and value "sleeves" as panel annotation metadata. In some embodiments, the digital file system may represent a garment using a coordinate system, where each panel of the garment may contain a unique set of coordinates in the coordinate system.

In some embodiments, the base digital file may also comprise instructions dictating how digital file component objects are arranged to form a garment. By way of example, the base digital file for a shirt may include sewing instructions dictating how seams represented by a seam object should stitch a front shirt panel object and a second shirt panel object together. Similarly, a base digital file may also comprise one or more edge objects representing an edge corresponding to a seam, and in turn, a panel. In some embodiments, an edge object may be an array of points and an edge type property. In some embodiments, the edge type property helps identify the type of edge (e.g., whether the edge is a straight line or a curve). In some embodiments, the type of edge used for a particular seam or panel may differ depending on the panel of garment itself. For example, a panel used for constructing a sleeve of a sweater may be associated with an edge object indicating a simple straight edge. On the other hand, a panel that constructs a portion of the neck of the sweater may instead be associated with a curved edge type.

In some embodiments, a curved edge in a panel may be represented using a Bezier curve. In some embodiments, the Bezier curve may be quadratic or cubic. In some embodiments, the quadratic Bezier curve may be defined by a vertex point and two handle points. In some embodiments, the quadratic Bezier curve may also comprise one or more control points allowing one main Bezier curve to split into multiple smaller curves connected via the one or more control points. In some embodiments, a cubic Bezier curve may be defined using two vertex points and two handle points. It may also be possible to include one or more control points that allows for a main cubic Bezier curve to be split into smaller connected curves.

Once the digital file system 120 generates a base digital file for a garment in a first size, the digital file system 120 may (3) store the base digital file in digital file data store 180. In some embodiments, the base digital file may be stored in an object-oriented format (e.g., JavaScript Object Notation (JSON) format). Since a product may have drastically different structures based on the customization options, in some embodiments the digital file system 120 may store multiple base digital files for the same product. For example, multiple base digital files may be generated for a shirt that could transform into a v-neck or crew neck depending on the cut of the cloth. Although both the v-neck and crew neck shirts are considered t-shirts, the patterns associated with the v-neck and the crew neck are drastically different and thus may justify having two different base digital files. In some embodiments, the digital file data store may be an array of base digital files, wherein each entry may also comprise a product identifier and a name. In some embodiments, the data store may also track whether a particular base digital file is considered a default option for the particular product. Furthermore, it will be appreciated that what is often described herein as individual objects within a single digital file (such as a panel object and a seam object) may instead be separate files, where at least one of the files refers to or references the other. Thus, in such embodiments, some files may be shared between two variations of a clothing item (such as the panels for sleeves of a v-neck shirt and crew neck shirt), while other files may differ (such as the front panel for the v-neck shirt versus the crew neck shirt).

Once the digital file system 120 generates a base digital file for a garment and stores the base digital file in digital file data store 180, the user system 110 may (4) select an alternate size or custom measurements for the garment via a user interface associated with retail system 119, and the digital file system may (5) receive the alternate size or custom measurement selection from the retail system 119. For example, a user on a website of an electronic retailer may initiate a purchase order for a shirt and select a standard size option (e.g., medium) from a drop-down menu of standard sizes (e.g., small, medium, and large) on a website associated with retail system 119. In some embodiments, a user may submit information regarding the user's body measurements to a profile stored with retail system 119. In such a case, the digital file system 120 may automatically receive the user's body measurement information from retail system 119 whenever the user initiates a purchase order for a garment. In some embodiments, the user may directly provide body measurement information to the digital file system 120 rather than through retail system 119.

The digital file system 120 may (6) generate a custom digital file upon receiving alternate size or custom measurement information or selections. In some embodiments, the custom digital file associated with an item may comprise the same components of the base digital file but with altered values. For example, if a base digital file for a pair of pants comprises panel objects of a standard small size, the custom digital file for the pair of pants in a standard medium size may comprise the same panel objects but sized for a standard medium pair of pants. In some embodiments, when a user selects an alternate standard size that is different from the size associated with the base digital file, the digital file system 120 may apply a grading scale to convert the pair of pants from the base size to the alternate size. For example, a grading scale may include one or more formulas that mathematically converts the measurements of one size of a garment into an alternate size.

In some embodiments, the grading scale may be a table of measurements in standard sizes, which a manufacturer may refer to in order to manufacture a garment in a particular standardized size. In some embodiments, the digital file system 120 may replace measurements stored in the base digital file with custom measurements transmitted to digital file system 120 from a user system 110, designer system 116, or retail system 119. For example, the digital file system 120 may replace a waist measurement associated with the base size of a pair of pants (e.g., 28 inches) with a custom waist measurement received from a user for the same pair of pants (e.g., 30 inches). This may also trigger various stored rules that cause changes or alterations in other values in the base digital file (besides the waist measurement itself) in order to keep desired proportions between components of the garment. The digital file system 120 may then (7) transmit the custom digital file to a manufacturer system 114. The user of a manufacturer system 114 may then use the custom digital file to manufacture the garment according to the alternate size or custom body measurements. Therefore, the manufacturer may successfully manufacture a garment with an appropriate fit without requiring additional input from a designer or a user.

Figure 3:
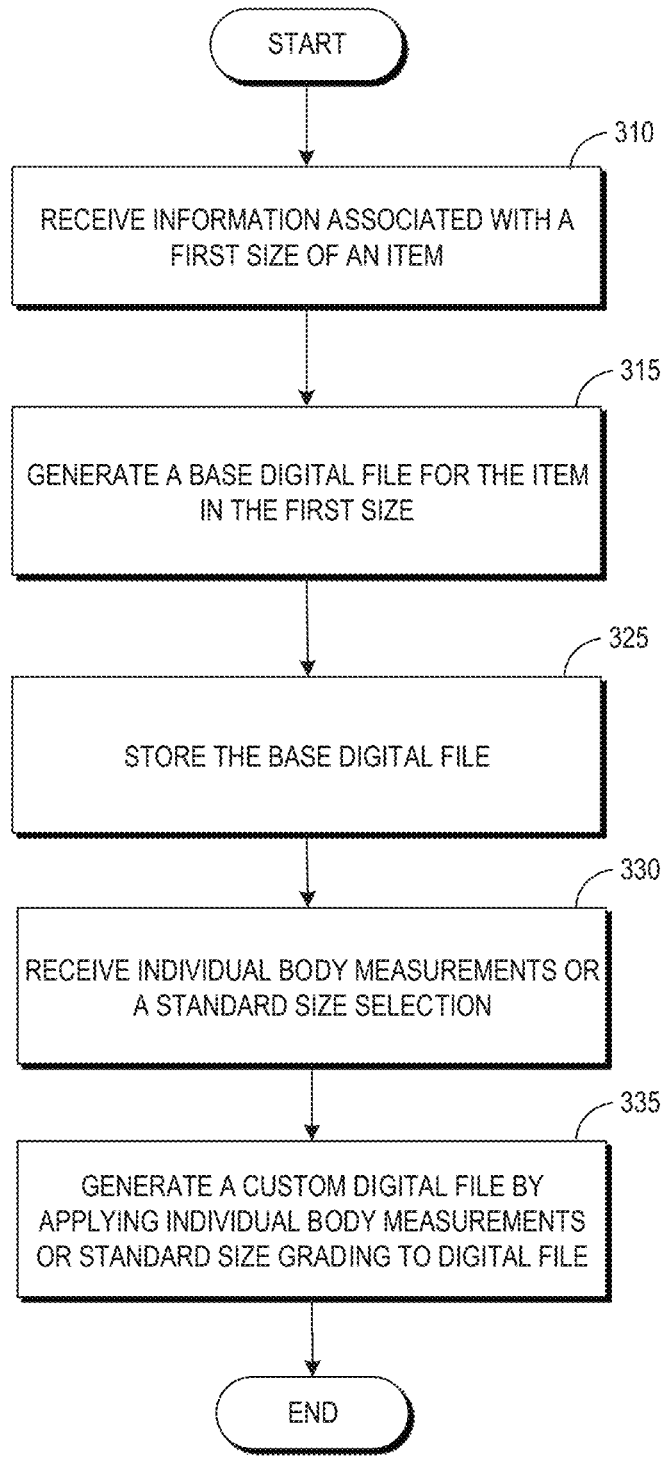
FIG. 3 is a flow diagram depicting an example method of generating a base digital file and custom digital file for garment production, according to some embodiments.

FIG. 3 is a flow diagram depicting an example method of generating a digital file, according to some embodiments. In block 310, the digital file system may receive information associated with a first size of an item. For example, the digital file system may receive a dxf or svg file depicting an image of a jacket along with handwritten notes about certain specifics of the jacket (e.g., the length of the right sleeve, the number of buttons on the jacket, or the placement of zippers). In some embodiments, the digital file system may receive information from a designer via a user interface associated with the digital file system 120. For example, a user interface may prompt the designer to draw a shape representing a panel of a garment. The designer may utilize the user interface to click on specific panels, reshape panels, select a seam to use on a particular panel via a drop-down menu, draw connections between panels, select a type of fabric to use when manufacturing a panel or garment, edit and view a specific panel, mark specific locations where embroidery should appear in a garment, etc.

In block 315, the digital file system may generate a base digital file for the item in the first size. An example of a base digital file may be seen in FIG. 4. The base digital file for the item may be generated based at least in part on the selections or input in a user interface associated with digital file system 120. For example, the user interface may prompt a clothing designer to provide responses to specific questions (e.g., what type of fabric should be used for this panel?), and the digital file system 120 may populate the provided response or selection into the base digital file.

At block 325 the digital file system 120 may store the base digital file in digital file data store 180. At block 330, the digital file system 120 may receive individual body measurements or a standard size selection from a user computing device. For example, a user on a website of an electronic retailer may initiate a purchase order for a shirt and select a standard size option (e.g., medium) from a drop-down menu of standard sizes (e.g., small, medium, and large). In some embodiments, a user may submit information regarding the user's body measurements to a profile stored with designer system 116 for a custom sized order rather than selecting a standard size. For example, a user may take a photograph of the user's body and submit the photograph to retail system 119. The digital file system 120 may automatically receive the user's body measurement information whenever the user initiates a purchase order for a garment, or the user may manually provide body measurement information to the retail system or digital file system 120. It will be appreciated that in other examples, the digital file system 120 may receive information other than an individual's body measurements or a standard size selection. For example, in some embodiments, the digital file system 120 may receive selections of specific patterns, embroidery, or fabrics to customize the garment.

Figure 4:
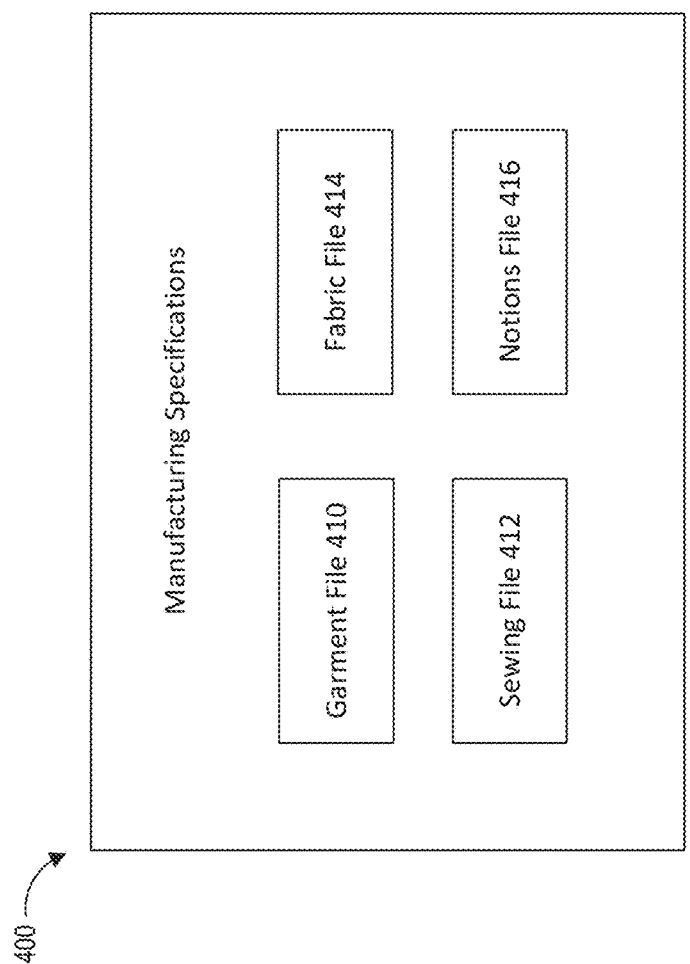
FIG. 4 is a visual representation of components of an example digital file utilized by the digital file system, according to some embodiments.

In block 335, the digital file system 335 may generate a custom digital file in response to receiving individual body measurements or a standard size selection. In some embodiments, the custom digital file may comprise the same files and/or objects as illustrated in FIG. 4. As mentioned above, in some embodiments, the custom digital file associated with an item may comprise the same components of the base digital file but with altered values. For example, if a base digital file for a pair of pants comprises panel objects of a standard small size, the custom digital file for the pair of pants in a standard medium size may comprise the same panel objects but sized for a standard medium pair of pants. In some embodiments, when a user selects an alternate standard size that is different from the size associated with the base digital file, the digital file system 120 may apply a grading scale to convert the pair of pants from the base size to the alternate size. In some embodiments, the digital file system 120 may replace measurements stored in the base digital file with custom measurements transmitted to digital file system 120 from a user system 110 or retail system 119. For example, in some embodiments, a panel may be associated with a unique identifier and an object representing a magnitude and unit associated with the panel. For example, a shirt panel may be associated with an object defining a unit of "centimeters" and a magnitude of "25" to indicate that the particular shirt panel should be 25 centimeters in length and width. In some embodiments, the digital file system 120 may replace the measurement associated with the base size (e.g., 25 centimeters) with a custom measurement received from a user for the same article of clothing (e.g., 30 centimeters), as well as alter measurements of nearby panels, seams and/or other objects of the garment according to preset rules or formulas.

FIG. 4 is a visual representation of components in an example digital file. Digital file 400 may be a text file comprising references to a garment file 410, sewing file 412, fabric file 414, and notion file 416. In other embodiments, digital file 400 may be a package that itself includes sub-files corresponding to garment file 410, sewing file 412, fabric file 414, and notion file 416. In still further embodiments, what are shown as different files or sub-files in FIG. 4 may instead all be included within a single file, such as a single text file, as different defined objects. In some embodiments, the digital file 400 may be used to manufacture a garment or create a digital visualization of the garment (such as a three-dimensional rendering of the garment worn by a virtual person).

In some embodiments, garment file 410 defines component parts of a garment. For example, garment file 410 may comprise a number of panel objects to create the garment. In some embodiments, the garment file 410 may also comprise a set of instructions specifying how to cut each panel of the garment file 410. For example, a front panel object associated with the front of a shirt may need to be cut at specific lengths to ensure the sleeves are of a certain size. In some embodiments, garment file 410 may also comprise objects representing details to consider in constructing the garment. For example, garment file 410 may comprise a fabrics object dictating what specific fabrics are used to create the garment. For example, garment file 410 may comprise a text file describing that a front panel object of a shirt and a back panel object for the same shirt are both created using a 90% cotton and 10% polyester fabric combination. In some embodiments, the garment file 410 may comprise a notions object identifying embellishments on the article of clothing. For example, a garment file 410 for a jacket may comprise a notions object defining a number of buttons to include on the jacket, the placement of said buttons on the various panel objects associated with the jacket, or the inclusion of any other embellishments in the garment (e.g., zippers, tassels, pockets).

In some embodiments, sewing file 412 may determine how different panels are sewed or stitched together. For example, a digital file for a pair of jeans may comprise a seam object identifying that cross-stitching should be used to stitch an inseam of the pair of jeans. On the other hand, a digital file for a jacket may comprise a seam object identifying that a buttonhole stitch be used to stitch an embroidered pattern onto the right sleeve of the jacket. In some embodiments, sewing file 412 may comprise a list of operations that may be performed on the panels. For example, sewing file 412 may reference the name of a JSON file associated with a specific operation to be performed in garment construction. For example, sewing file 412 may reference by name a "stitch" operation file defining how to stitch two seams using a specific stitch type (e.g. lock stitch). It will be appreciated that sewing file 412 may not be limited to only sewing or stitching instructions. For example, sewing file 412 may comprise construction instructions that define how to attach a patch or print onto a panel or how to include buttons or button holes on one or more panels. In some embodiments, each operation may be associated with parameters or other metadata. For example, a lock stitch operation may comprise a parameter called "length" which may define the overall size of the stitch, an upper thread identifier defining what thread should be used for an upper thread of a stitch, and a lower thread identifier defining what thread should be used for a lower thread of a stitch. It will be appreciated that other operations may include other types of metadata. For example, a button placement operation may comprise button spacing metadata defining the amount of space to include between each button on a particular panel.

In some embodiments, fabric file 414 may comprise information specific to different fabrics used in garment construction. For example, assuming that a garment file 410 specifies that cotton should be used to create a t-shirt, the fabric file 414 may comprise a text file indicating that the t-shirt should specifically comprise cotton twill fabric. In some embodiments, notions file 416 may comprise information specific to different notions used in garment construction. For example, assuming that a digital file for a coat may specify that the coat comprises five buttons ordered vertically down the center length of the coat, the notions file 416 may comprise a text file indicating that each button be made of brass. In some embodiments, the fabric file 414 may contain metadata relevant to the fabrics used for constructing a garment. For example, in some embodiments fabric file 414 may comprise a product identifier identifying the particular article of clothing, a panel identifier to identify a specific panel of the article of clothing, and an array of fabrics wherein each entry in the array indicates a particular fabric to be used for constructing the panel associated with the panel identifier. In some embodiments, the fabric file 414 may also comprise color metadata identifying the color of specific fabrics used in a particular panel of the garment.

An individual may access digital file 400 in order to make changes to the digital file. For example, if a clothing designer initially generates a digital file 400 to represent a shirt initially made with three distinct panels, the clothing designer may later edit the garment file 410 to change the number of panels from three to four panels. In some embodiments, multiple people may access digital file 400. For example, a digital file may be stored in a public or private repository accessible by a group of clothing designers so that the clothing designers may collaborate to create a unique or complex article of clothing. In such an example, each clothing designer may have the ability to directly edit any of the garment file 410, sewing file 412, fabric file 414, or notions file 416 in digital file 400. In some embodiments, digital file 400 may be opened using a variety of software applications (e.g., LibreCAD or AutoCAD) for ease of accessibility. For example, user interfaces accessible via a customized design application or a browser may enable a user to visually design and edit components of a garment (such as panels, annotations, fabrics and other features), which may then cause a computing system to automatically edit the corresponding object data defined in a corresponding digital file.

In some embodiments, the digital file 400 may be generated based at least partly on information pulled from libraries or digital repositories. In some embodiments, the digital file 400 may contain references to files stored in a remote library. For example, if a file stored in a public online repository lists general information regarding a type of cotton that may be used in clothing manufacturing, a fabric file 414 may reference the file by name or fabric identifier to provide information regarding the specific type of cotton that may be used for a specific garment or panel in a garment. In some embodiments, the library may also comprise other information used for garment production (e.g., a type of curve to use for sewing). In some embodiments, the digital file 400 may contain multiple references from a plurality of libraries, data sources, or files. For example, notions file 416 may contain references to a list of embroidery files stored in a first library while sewing file 412 may reference by name a sewing instructions file stored in a separate library in order to efficiently compile manufacturing information for a particular garment. In some embodiments, digital file 400 may also contain copies of libraries or files that are initially stored in a remote library or data source. In some embodiments, the digital file 400 may be an extendable JSON file that permits a user to add, remove, or otherwise edit component files in the digital file 400. For example, a clothing designer may decide to implement additional embroidery to a pair of pants and may therefore either add a reference to a particular embroidery file in a remote repository or add a copy of a remote library containing the additional embroidery information. In some embodiments, the copy of a library or file may be altered by the clothing designer without affecting the original file or library that may be stored in a remote repository.

Figure 5:
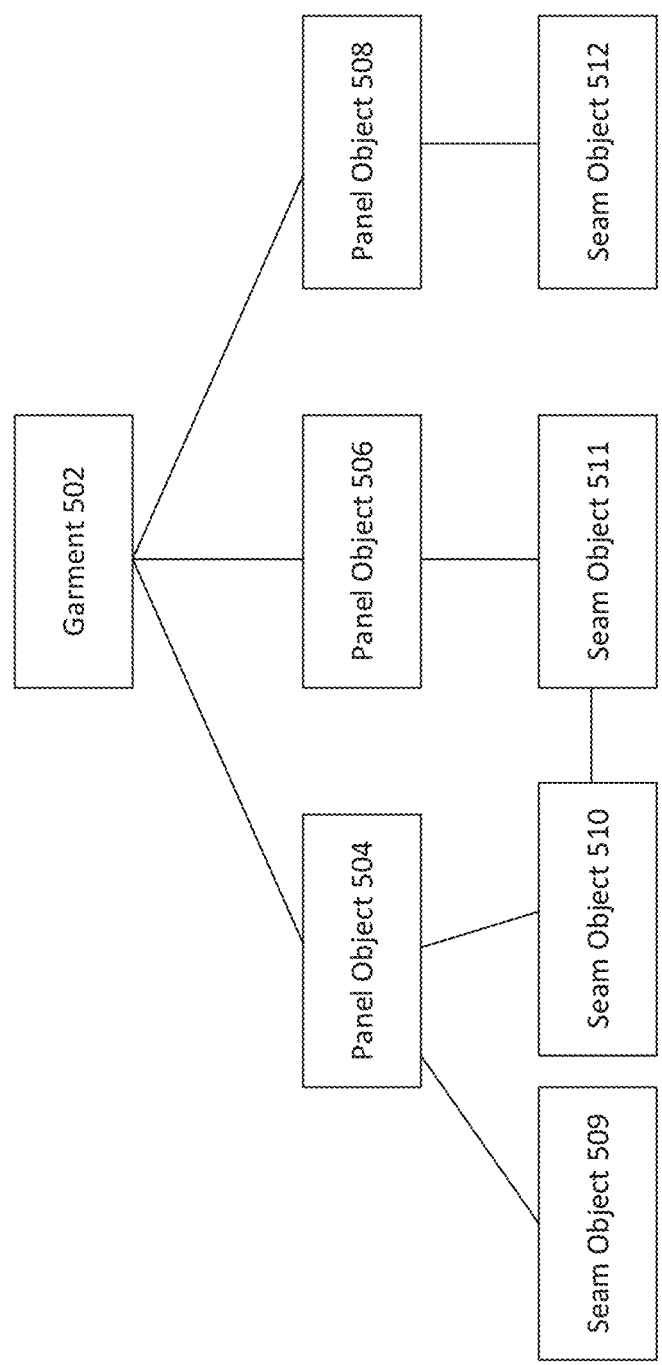
FIG. 5 is a visual representation depicting an example configuration of garment components in a digital file system, according to some embodiments.

FIG. 5 is a visual representation depicting an example configuration of garment components in a digital file system, according to some embodiments. The objects illustrated as visually connected in FIG. 5 may be associated with each other in one or more digital files by object-based notations that reference an object by identifier, name or other manner. In some embodiments, garment 502 may be an article of clothing (e.g., a hoodie) listed and sold on an electronic catalog. In some embodiments, garment 502 may comprise a plurality of panel objects 504, 506, and 508, where each panel object represents a discrete section or portion of the garment (such as a single portion of fabric cut to a certain shape). For example, if garment 502 is a hoodie, then panel object 504 may represent a front body portion of the hoodie, panel object 506 may represent a back portion of the hoodie, and panel object 508 may represent the hood of the hoodie. Panel objects 504, 506, and 508 may therefore be related portions of the overall garment. In some embodiments, the panel objects may comprise a number of seam objects. For example, panel object 504 may include or be associated with seam objects 509 and 510 (such as the panel object data for panel object 504 referencing the seam identifiers of seam objects 509 and 510, or seam object data for seam objects 509 and 510 referencing a panel identifier of panel object 504), panel object 506 may contain or be associated with seam object 511, and panel object 508 may contain or be associated with seam object 512. In some embodiments, seam objects may be joined together according to a specific set of sewing instructions. For example, sewing instructions referencing seam object 510 and seam object 511 may provide instructions for stitching together the panels represented by panel objects 504 and 506.

It will be appreciated that any number of panel objects or seam objects may be included in a particular garment. For example, a relatively simple t-shirt may only have panel objects representing a front and back side to the shirt, joined together by one set of stitches. On the other hand, many more panel objects and seam objects may be included under garment 502 if garment 502 is a complex piece of clothing (e.g., a fashionable jacket). Although the example of FIG. 5 displays panel objects and seam objects, it will be appreciated that other objects may be included in other embodiments. For example, garment 502 may also comprise a notions object branching out from panel object 504 indicating that a piece of embroidery is located on the portion of clothing represented by panel object 504. Similarly, other notions objects may be included to indicate the presence of other visual embellishments on the garment 502, such as buttons or zippers.

FIG. 6 is a visual representation of an example garment object utilized in a digital file system, according to some embodiments. As mentioned above, a garment may be represented as a file in an object notation format, such as a JSON file, wherein the JSON file comprises one or more panel objects. In some embodiments, each panel object may correspond to a discrete portion of an article of clothing. In some embodiments, each panel object may be an entry in an array of panel objects. In some embodiments, a garment object may further comprise an array of notions 614, wherein each entry in the array of notions 614 corresponds to an embellishment or visual personalization of the garment (e.g., buttons, or zippers). For example, an array of notions may comprise JSON files corresponding to threads, collars, embroidery, standardized labels, and custom labels to be included in the garment.

FIG. 7 is a visual representation of an example panel object utilized in a digital file system, according to some embodiments. In some embodiments, a panel object may be represented as a file in an object notation format, such as a JSON file, and may refer to other objects within the digital file. For example, a panel object may include an array of seams 710, wherein each entry in the array of seams dictates a particular sewing or stitching method to generate a particular seam for the garment. In some embodiments, each panel object may comprise a garment ID to associate the panel to a particular article of clothing, and one or more notions objects specifying a number of enhancements or details to the garment.

FIG. 8 is a visual representation of an example seam object utilized in a digital file system, according to some embodiments. In some embodiments, a seam object may be represented as a file in an object notation format, such as a JSON file, and may comprise details to be used in garment manufacturing. For example, a seam object may include an array of edges 830, wherein each entry in the array of edges dictates a particular type of edge to generate a panel of the garment. In some embodiments, each seam object may comprise a seam ID 810 to associate the seam to a particular panel in the garment, and one or more notions objects specifying a number of enhancements or details to the garment. In some embodiments, the seam object may also include a seam allowance 820 which provides measurements for an area between a panel edge and a seam or stitching.

While FIGS. 6, 7, and 8 are described with reference to JSON files, it will be appreciated that many alternative formats may be employed for conveying object data for a garment in other embodiments. For example, according to some embodiments, a file format of a digital file as described herein may generally be one that uses human-readable text to transmit data objects consisting of attribute-value pairs, array data types and/or other attributes or parameters having associated values. These may be desirable traits of a format used in aspects of present disclosure because it enables humans (such as designers and/or manufacturers) to read and understand the object data, while also being easily capable of processing, parsing, and modification by software, hardware and/or firmware of a computer system (such as a system utilized by a retailer, a designer, and/or a manufacturer).

Figure 9:
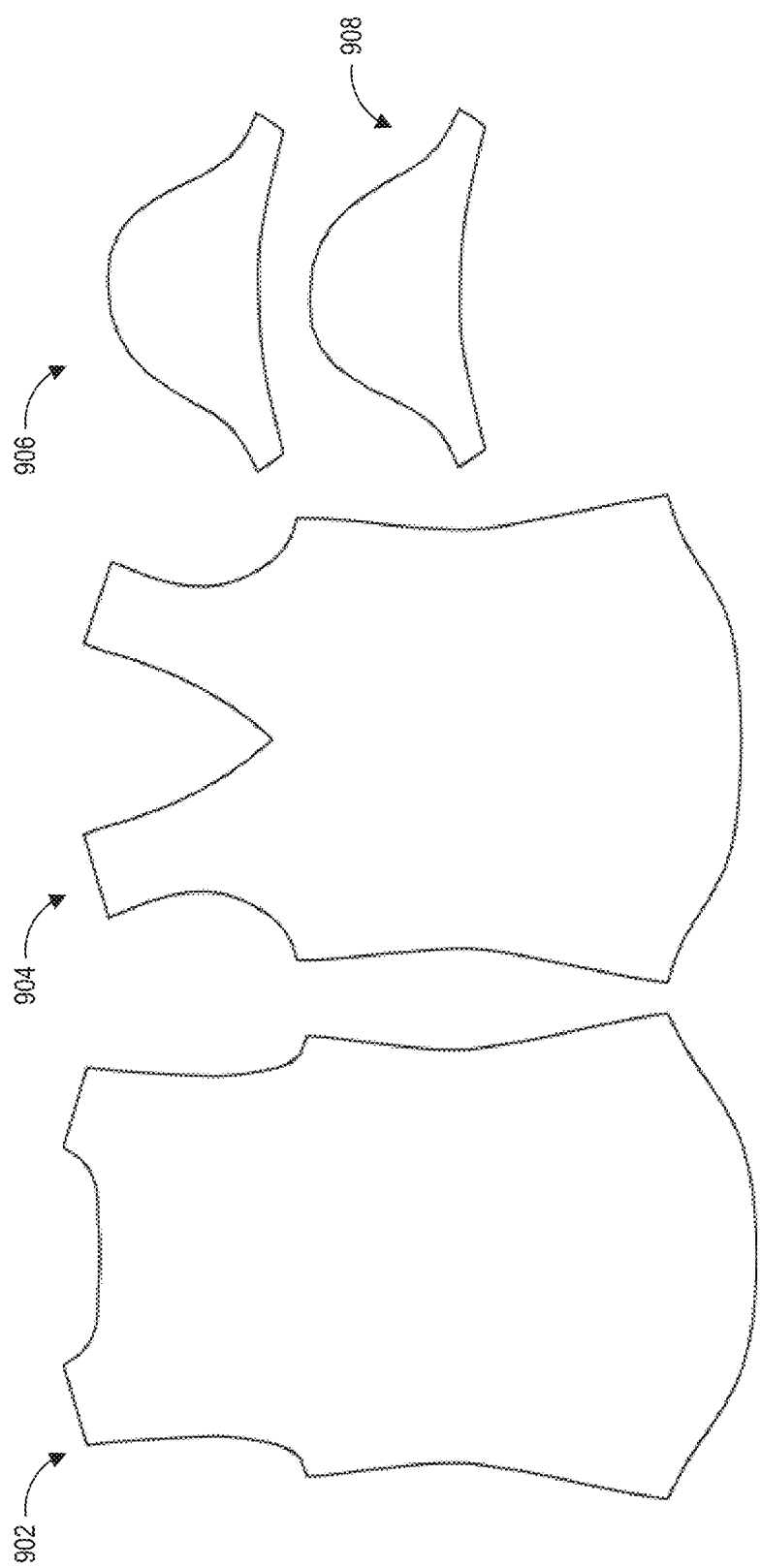
FIG. 9 is a visual representation of panels utilized in a digital file system, according to one embodiment.

FIG. 9 is a visual representation of panels that may be defined by object data in a digital file system, according to some embodiments. A digital file may comprise a plurality of panels, wherein each panel represents a portion of the overall garment. For example, panel 904 may represent a front portion of a shirt, while panel 902 may represent a back portion of the same shirt. Furthermore, panels 906 and 908 may each represent a sleeve portion of the shirt. It will be appreciated that additional or fewer panels may be included in the garment depending on the overall complexity of the garment itself. Furthermore, panels 902, 904, 906, and 908 may each include a number of notions and seams to help a manufacturer properly construct the garment. The shapes of the illustrated panels may be defined, for example, in mathematical terms, such as with reference to measurements and curve specifications, within object data for the respective panel.

Figure 10:
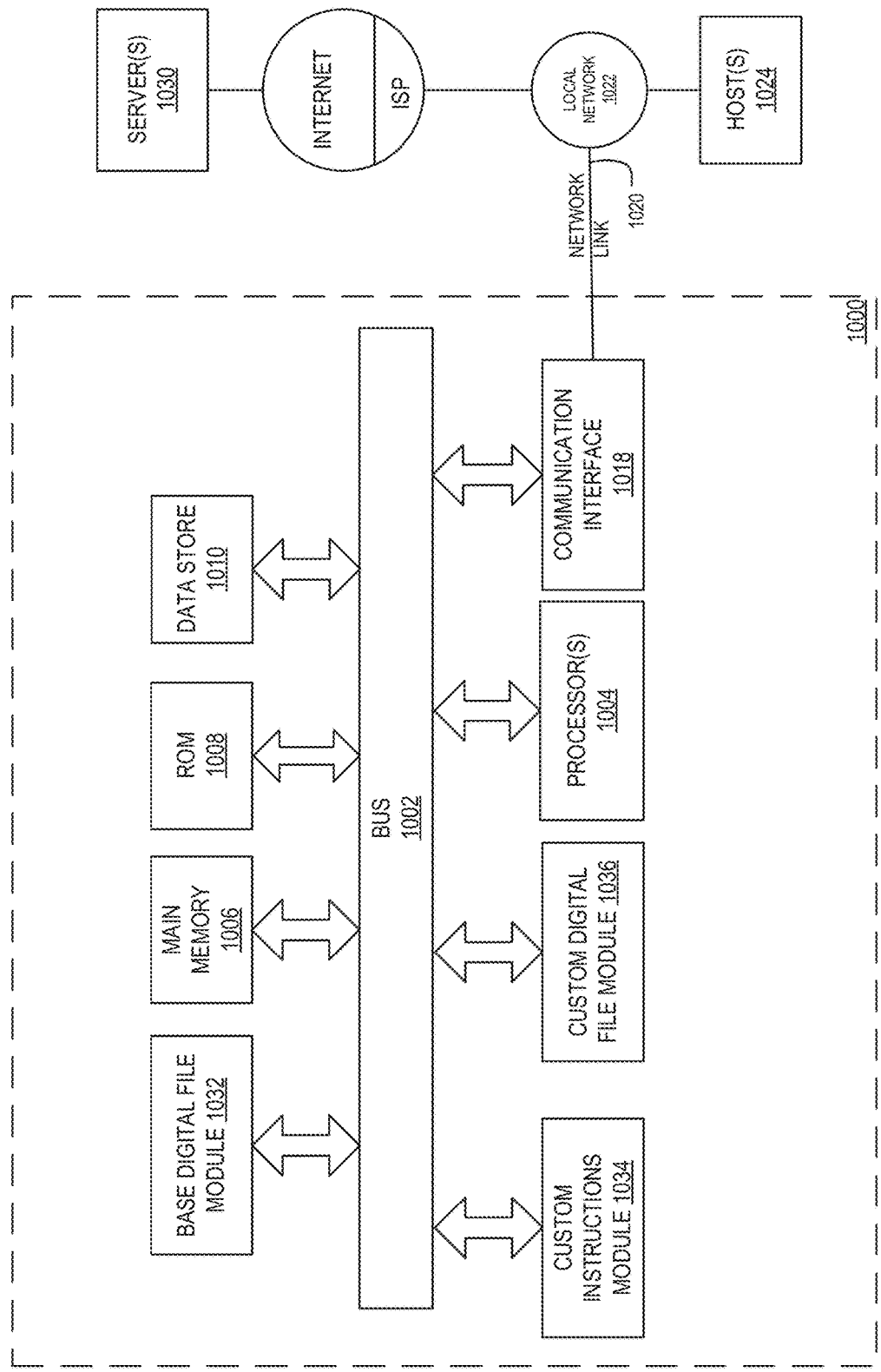
FIG. 10 is a diagram of an example computing system configured to perform the digital file generation and other methods described herein.

FIG. 10 is a diagram of an example computing system configured to perform the various methods described herein. The computing system 1000 may be configured to perform all or some of the features of the digital file system 120. The computing system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

The computing system 1000 also includes a main memory 1006, such as a random access memory (RAM), cache, or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render the computing system 1000 into a special-purpose machine that is customized to perform the operations specified in the instructions.

The computing system 1000 further includes a read only memory (ROM) 1008 or other static storage device coupled to bus 1002 for storing static information and instructions for processor 1004. Data storage device 1010, such as a magnetic disk, optical disk, or a USB thumb drive (Flash drive), etc., is provided and coupled to bus 1002 for storing information and instructions.

The computing system 1000 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 1000 to be a special-purpose machine. According to one embodiment, the techniques herein may be performed by the computing system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

As part of a special-purpose machine, the computing system 1000 may include base digital file module 1032, custom instructions module 1034, and custom digital file module 1036. According to one embodiment, base digital file module 1032 may receive information regarding creating an article of clothing in a base size. In some embodiments, the base digital file module may receive the information and divide it into components and/or objects of a base digital file. In some embodiments, custom instructions module 1034 may receive a user input from a user system that includes a standard size selection or custom body measurements. In some embodiments, custom digital file module 1036 may generate a custom digital file by applying a grading scale to scale the measurements of the item associated with the base digital file to a new standard size. In some embodiments, custom digital file module may generate a custom digital file tailored to the standard size selection or custom body measurements by replacing any measurements stored in the base digital file with the custom body measurements. Digital files utilized by modules 1032, 1034, and 1036 may be stored in data store 1010. According to one embodiment, instructions may be transmitted through communication interface 1018 to one or more servers 1030. The instructions transmitted may be stored in ROM 1008 in one embodiment.

Various forms of computer readable storage media may be involved in carrying one or more sequences of one or more computer readable program instructions to processor 1004 for execution. For example, the instructions may initially be carried on a magnetic disk or solid state drive of a remote computer. The bus 1002 may carry data to main memory 1006, from which processor 1004 retrieves and executes the instructions.

The computing system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicate with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP). The ISP in turn provides data communication services through the Internet to a server 1030.

Figure 11:
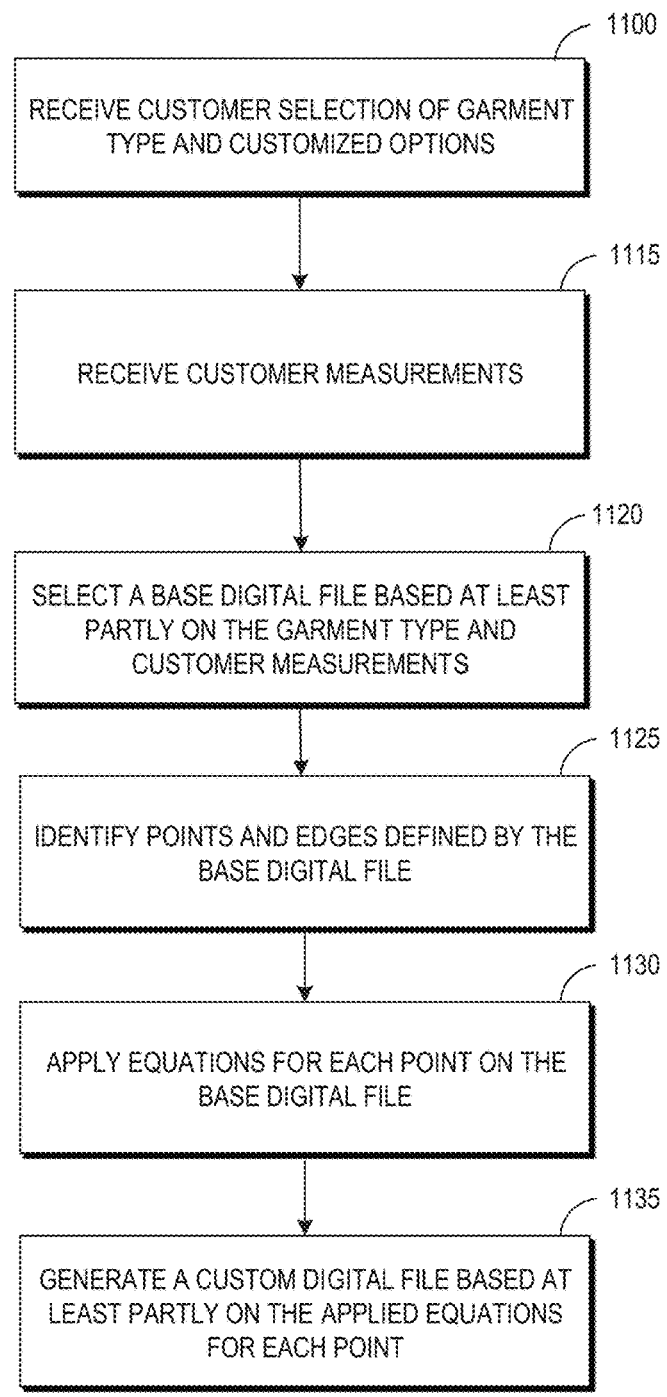
FIG. 11 is a flow diagram depicting an example method of generating a custom garment, according to some embodiments.

FIG. 11 is a flow diagram depicting an example method of generating a custom garment, according to some embodiments, such as based on a specific user's body measurements. In block 1100, the digital file system may receive a customer selection of a garment type and customized options. In some embodiments, a user or customer may select the garment type and customization options through a user interface displayed on a user system. For example, a customer may use a touch gesture to tap a garment type option labeled "T-Shirt" displayed on the screen of a mobile computing device. In some embodiments, the customer or user may also select one or more customization options associated with the selected garment type. For example, a user may have the option to customize the fabric, color, fit, length, neckline, or sleeves of a "T-shirt" garment type, etc. In some embodiments, a user interface or series of user interfaces may be presented that include drop-down menus or similar interface functionality for each of a variety of customization options. In some embodiments, an initial garment type selection (such as a shirt, sweatshirt, jeans, etc.) may result in presentation of selectable customization options that are specific to the selected garment type (such as options to select between short sleeves or long sleeves for a shirt, or between boot cut or straight cut for jeans).

In block 1115, the digital file system may receive customer measurements to generate a custom garment. In some embodiments, a user may provide measurements of the user's body by entering the appropriate measurements directly into one or more text boxes or entry fields in a visual interface. For example, a user may enter "176" into an entry field labeled "Height (centimeters)." In some embodiments, a user may view a list of available measurements from a drop-down menu and select a value corresponding to the user's own body measurement.

Figure 13A:
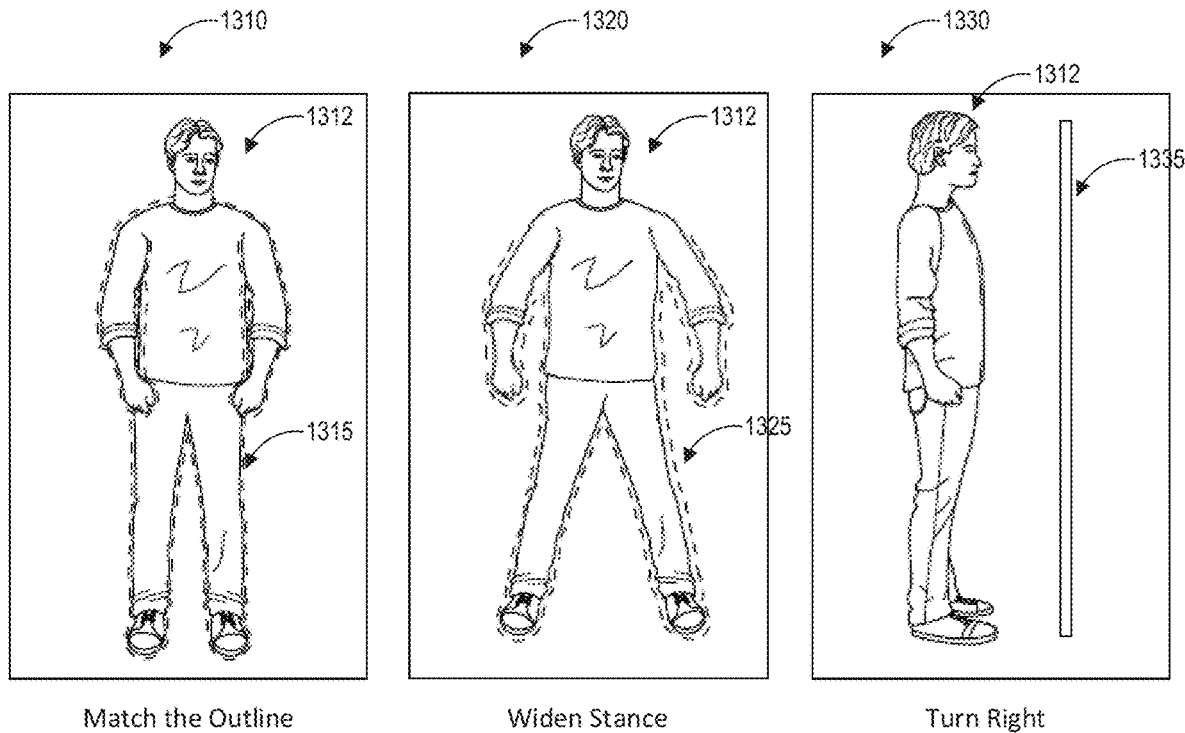
FIG. 13A is a visual representation depicting an example method of receiving user measurements to generate a custom garment, according to some embodiments.

As further shown in FIG. 13A, the digital file system may receive or determine customer measurements through a series of photos submitted by the user or captured by a camera of a user's computing device (such as images of the user captured via a guided user interface). For example, a visual interface displayed on the user's mobile computing device may prompt the user to take photo 1310, photo 1320, and photo 1330 in sequential order using the mobile computing device's integrated camera. Photos 1310, 1320, and 1330 represent photos of the user in different poses or positions. For example, photo 1310 depicts the user while the user is standing facing the camera, photo 1320 depicts the user while the user stands facing the camera in a widened stance, and photo 1330 depicts the user while the user turns away from the camera towards the right.

In some embodiments, the digital file system or an associated application installed on the user's mobile device may cause overlays or visual aids to be displayed while the camera is operational on the user device, such as while the screen of the device presents a live camera view as the camera is positioned to capture images of the user. In some embodiments, the visual aids, overlays, or guidelines may be displayed on the screen of the user device to help guide the user into a particular pose for each photo. For example, while user 1312 is facing the camera, overlay 1315 may appear on screen as a dashed line outlining the pose that the user should imitate for photo 1310. By observing overlay 1315 in relation to the user's current pose, user 1312 may adjust the position of his arms and legs to fall in line with overlay 1315.

In photo 1320, overlay 1325 may appear on screen as a dashed line outlining the pose that the user should imitate for photo 1320. By observing overlay 1325 in relation to the user's pose in photo 1320, user 1322 may spread his arms and legs out to mimic the widened stance of overlay 1325. In photo 1330, overlay 1335 may appear as a vertical bar on the right side of the user device's display to prompt the user 1332 to rotate or turn his body towards the bar so that the user device camera may capture a picture showing the user's right side. In some embodiments, an overlay may be accompanied with text to further guide the customer. For example, the text "Match the Outline" may appear in conjunction with overlay 1315 to help the customer understand what is appearing on screen and how to proceed with the customization process.

In photo 1330, the words "Turn Right" may be included alongside overlay 1335 to direct the customer and to let the customer know that a completely different orientation is required. The digital file system may receive photos 1310, 1320, and 1330 (such as from the user's device over a network, such as the Internet) and extract or estimate the user's body measurements based on the submitted photos 1310, 1320, and 1330. For example, the digital file system may predict body metrics of the user from the submitted photos using methods described in U.S. Pat. No. 10,679,046, entitled "MACHINE LEARNING SYSTEMS AND METHODS OF ESTIMATING BODY SHAPE FROM IMAGES," which is hereby incorporated by reference in its entirety herein. It will be appreciated that a user may submit fewer or additional photos to provide the user's measurements to the digital file system.

Returning to block 1120 in FIG. 11, the digital file system may select a base digital file based at least partly on the selected garment type and customer measurements. In other embodiments, the selection of the base digital file may also be based in part on one or more user-selected customization options (such as in instances or embodiments where a different base digital file has been previously stored for a crew neck shirt than for a v-neck shirt). In some embodiments, the digital file system may select a base digital file by comparing the selected garment type (potentially considering selected customization options as well, in some embodiments) with a garment identifier associated with the base digital file. For example, each garment type may be associated with one or a subset of all garment identifiers stored in the digital file system. In some embodiments, the digital file system may sift through base digital files by examining the selected customization options and customer body measurements. For example, the digital file system may select a base digital file corresponding to a large t-shirt if the customer's height measurement is 77 inches or above. Accordingly, there may be stored association data that identifies a single base digital file to be used for each possible unique combination of garment type and customization options. In some embodiments, there may be a single base digital file for each garment type, while in other embodiments a given garment type may have a number of base digital files that are each used for a different range or set of customization options or body measurements.

In block 1125, the digital file system may identify points and edges defined by the base digital file. In some embodiments, each panel object associated with the base digital file may comprise a number of distinct points and edges. For example, with reference to FIG. 9, panels 902, 904, 906, and 908 may each contain a set of points and edges connecting the points to form the panel. In some embodiments, the number of points and edges in the base digital file may be used to define the number of points and edges in a custom digital file. For example, if a panel in a base digital file includes five points with edges that are all straight lines, the base digital file may be used as reference to generate a panel in a custom digital file that also contains five points with straight line edges.

In block 1130 of FIG. 11, the digital file system may apply equations for each point identified in the base digital file. In some embodiments, one or more equations may be stored as a JSON file or other storage format by the digital file system in a data store. In some embodiments, the equations may be used to transform a garment represented by a base digital file into a custom garment represented by a custom digital file. For example, the system can determine a custom location for each point identified in the base digital file by applying one or more equations to the points. In some embodiments, a point associated with the base digital file may be associated with a first coordinate location in a first coordinate system while the custom location of the point may be associated with a second coordinate location in a second coordinate system. In some embodiments, the first coordinate system and the second coordinate system may generally define point locations in the same or similar manner (e.g., may both define points by x and y values in a Cartesian coordinate plane) yet remain independent from one another (such as by points in the second coordinate system not being defined relative to any point in the first coordinate system). Differences between the coordinate systems may include each having a different origin point. Accordingly, the first coordinate location of (1, 1) in a first x-y coordinate system does not necessarily mean that the first coordinate location is near the position of a second coordinate location of (2, 2) in a second x-y coordinate system. In some embodiments, a user (such as a garment designer or a back-end user of the system that establishes the equations in advance, before customer orders are accepted) may define specific equations to associate with a particular garment type or even define specific equations for specific points on the garment itself. In some embodiments, the digital file system may retrieve the equations upon detecting the selected garment type, base digital file, and individual points represented in the base digital file. The digital file system may apply an equation to each point identified in a panel of the base digital file. In some embodiments, the equations applied to each point may be based at least partly on a customer's specific body measurements. For example, the coordinate location of a first point on a custom t-shirt garment may be defined as a multiple of the customer's neck girth measurement. Certain points' equations may reference other points that are defined by their own formula(s). Each x and y value of a given point may have has its own independent formula. In some embodiments, each formula may include some combination of one or more of: a reference to a user body measurement (e.g., neck girth, arm length, etc.), a reference to another point's location (such as an x and/or y value of another point identified in the same base digital file), mathematical operators, and numbers.

In some embodiments, after initially applying the equations that define coordinate positions for the various points, the system may implement additional seam matching equations and/or quality control checks. For example, the system may check that a shirt's armhole length in the front and back of the shirt are the same. If not, the system may adjust the point locations of one or both of the armholes such that they align or match. As another example, the system may check and adjust points (if mismatched) such that that side seam aligns in the front and back of a garment, check that a sleeve cap length matches a front armhole length and back armhole length, check that each of the panels are closed loop, check that panels match or approximate a general structure defined by the base digital file, and/or other quality checks.

In block 1135, the digital file system may generate a custom digital file based at least partly on the applied equations for each point. In some embodiments, the custom digital file may define the coordinate location of each point in the panel objects associated with the custom digital file. For example, a custom digital file associated with a shirt may comprise an x-y coordinate for each point that is defined by one or more equations. It will be appreciated that, in some embodiments, the coordinate locations of each point in the custom digital file may not necessarily be a simple scaled multiple of the points identified in the base digital file. In some embodiments, the coordinate location of each point in the custom digital file may be based on the received customer measurements and equations that specifically reference the unique customer measurements. The customer digital file may be stored for later use in producing the custom garment, and/or for generating a preview rendering of the garment for display to the user (such as a virtual version of the garment appearing as worn by a rendered avatar or 3D body approximating the appearance of the user based on body measurement data).

Figure 13B:
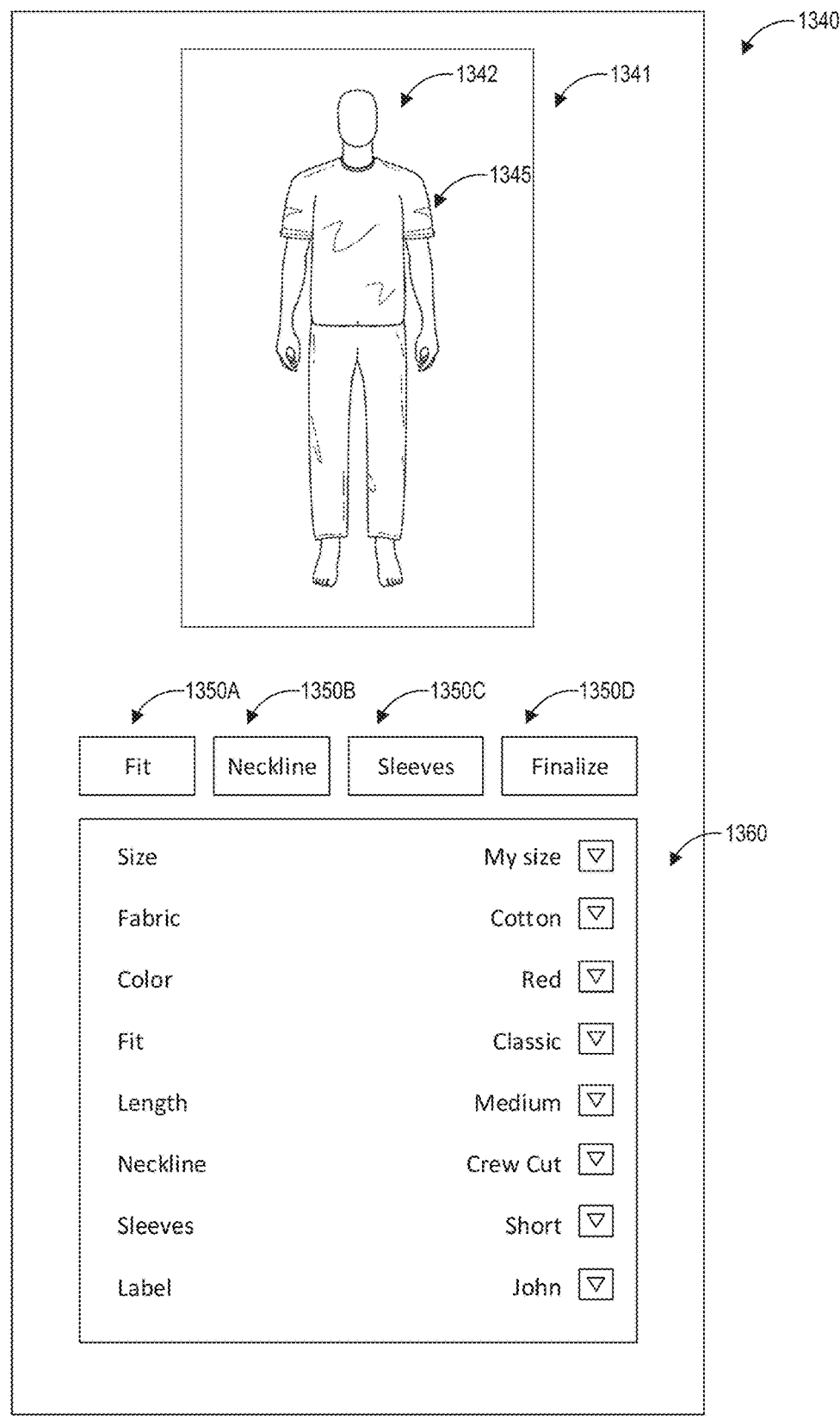
FIG. 13B is a visual representation depicting an example preview of a custom garment, according to some embodiments.

With reference to FIG. 13B, the digital file system may display an example visualization of the garment represented by the custom digital file. For example, the digital file system may display an interface 1340 that depicts a visualization of garment 1345 in window or interface portion 1341. In some embodiments, window 1341 may also display how garment 1345 may actually fit by rendering garment 1345 as appearing to be worn by virtual avatar 1342, which may be 3D rendered to appear to have body proportions similar to the user's body measurements. In some embodiments, the system may render virtual avatar 1342 through a model stored in the system. For example, a set of virtual body models (such as 3D mesh data or other known 3D modeling formats) may be stored in a database, wherein each model in the database represents a virtual avatar with a set of body measurements. The digital file system may render virtual avatar 1342 by selecting a previously stored model with measurements that most closely match or resemble the user's body measurements. In some embodiments, the digital file system may render garment 1345 using one or more model garment pieces. For example, a set of virtual garment pieces or panel objects may be associated with each garment type (such as in the form of 3D model and texture data, or as images that may be assembled to form a rendered view of the garment), and each garment piece may be associated with one or more customization options. The digital file system may render garment 1345 by processing one or more customization options selected for the garment, selecting the garment pieces associated with the customization options, and piecing the garment pieces together to form garment 1345. In some embodiments, window 1341 may be accompanied by tabs 1350A, 1350B, 1350C, and 1350D and window or interface portion 1360. Tabs 1350A-1350D may contain information specific to the custom garment displayed in window 1340. For example, by selecting tab 1350D, a customer may make a series of customization selections by using an application in a retail environment and may quickly view a brief summary of the information regarding the custom garment in window 1360.

In some embodiments, visual interface 1340 may include buttons in window 1360 to allow a customer to edit any selection or information in the window. For example, if a customer wants to see how a different customization option will appear, the customer may click on a button or other selectable option next to any of the customizations listed in window 1360 and select a change. For example, the customer may decide to switch the garment color from red to blue and may therefore select the appropriate color option by clicking the button next to the color selection. In some embodiments, interface 1340 may update to reflect any change to the customization options in window 1360. For example, if the customer actually changed the garment color, window 1341 will update to show garment 1345 in the newly-selected color. In some embodiments, an interface similar to interface 1340 may be presented to a user prior to receiving any body measurement data for the user and prior to the user making any initial garment selections. For example, such an interface (either with or without a garment preview similar to window 1341) may be presented to a user in response to a user indicating interest in designing a custom garment for potential purchase, and may additionally include a selectable option for the garment type (e.g., a shirt, jeans, sweatshirt, dress, etc.).

In some embodiments, changes to a garment's customization options in window 1360 may require the digital file system to select a new base digital file to generate the custom garment. For example, if a customer ordering a pair of jeans initially considered a pair of boot-cut jeans but then decided to change the fit to "slim fit," the digital file system may reference a different base digital file associated with a slim fit jeans garment. In some embodiments, the digital file system may be required to utilize equations associated with the new base digital file to customize the garment. It will be appreciated that not all changes require the system to use a different base digital file. For example, if a customer changed the length of a shirt sleeve, the system may not require a new equation to represent the change. In such cases, the system may run the equations again using the newly-provided measurements or selections instead of retrieving an entirely new base digital file and new equations.

Figure 12:
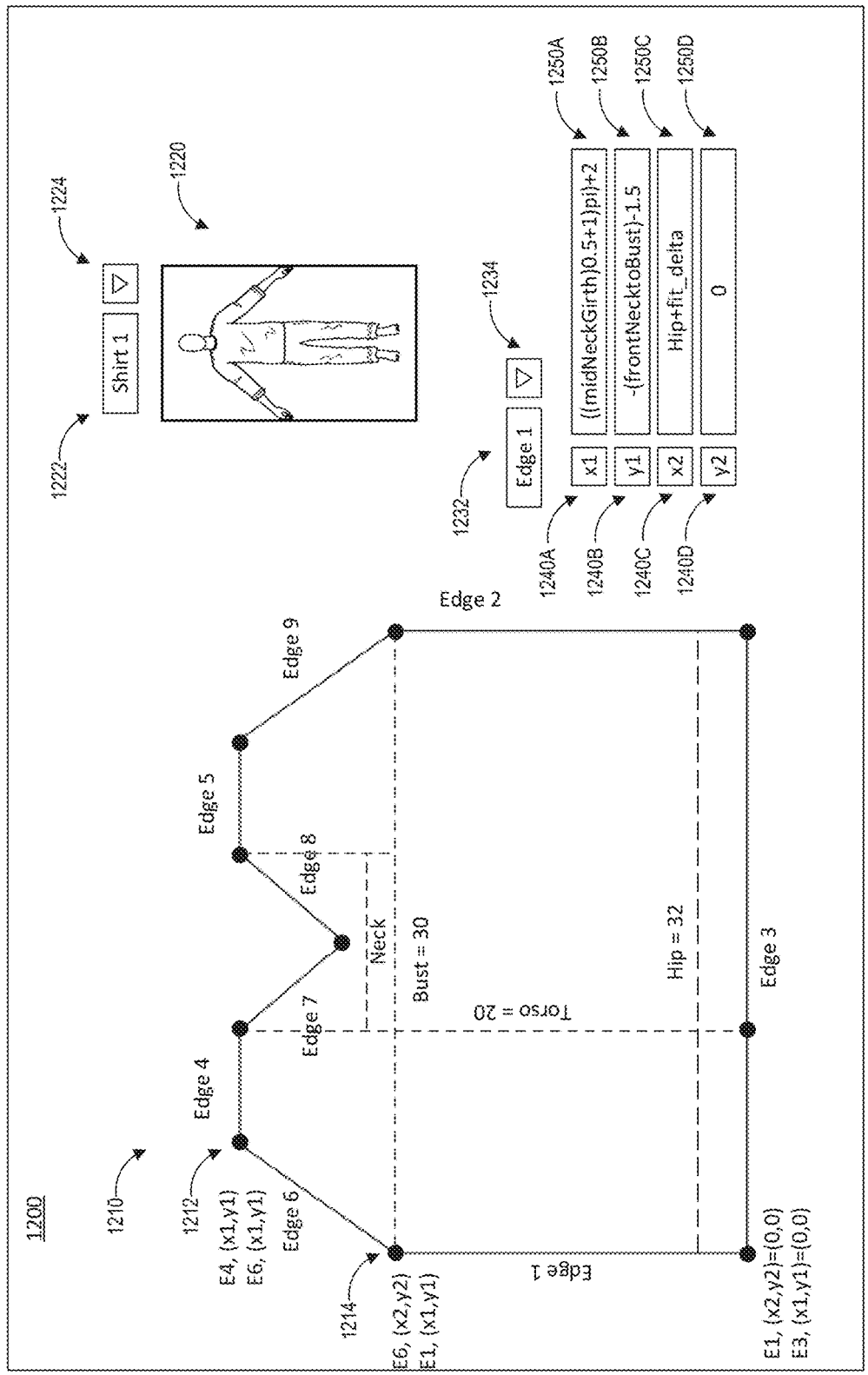
FIG. 12 is an example visual interface for editing equations to generate a customized garment, according to some embodiments.

FIG. 12 is an example visual interface for editing equations that will later be used to generate a customized garment, according to some embodiments. For example, FIG. 12 may enable a one-time setup for a base digital file that defines the equations that will then be used to generate a potentially unlimited number of different customized garment instances based on different users' body measurements. A back-end user may utilize visual interface 1200 to view garments, garment types, or panels and to edit equations associated with the garments, garment types, or panels. Visual interface 1200 may include an input field 1222 and button 1224 to allow for selection of a particular garment to view. For example, a back-end user may type "Shirt 1" or click button 1224 to select "Shirt 1" from a drop-down menu of available garments. Upon receiving a selection of a particular garment, visual interface 1200 may display a window 1220 and panel 1210. In some embodiments, window 1220 may provide an example representation of the selected garment. For example, if a jacket garment is selected, window 1220 may populate with a representation of the jacket worn by a virtual avatar.

In some embodiments, the visual representation of the garment in window 1220 may be based at least partly on equations customizable by the user. For example, if the back-end user edits any of the equations 1250A, 1250B, 1250C, and 1250D corresponding with a coordinate location represented by coordinate variables 1240A, 1240B, 1240C, and 1240D, then window 1220 may dynamically render a new representation of the garment based on the changes. In some embodiments, the equations 1250A-1250D may each be stored in a file on a data store. For example, equations defining a panel of a pants garment may be stored in a JSON file. The JSON file may be associated with a garment identifier associated with the garment and may further be associated with a specific panel associated with the garment. It will be appreciated that, in some embodiments, an ordinary customer in a retail environment may not have access to interface 1200 and may not edit any information or equations within.

Visual interface 1200 may display a panel 1210 representing a panel object associated with the base digital file of the selected garment. Panel 1210 may depict edges 1, 2, 3, 4, 5, 6, 7, 8, and 9 as well as individual points connecting the edges 1-9 together. For example, point 1212 represents a connection between edge 4 and edge 6, while point 1214 represents a connection between edge 6 and edge 1. Each edge in panel 1212 may be defined by a set of coordinates in a coordinate system and a type of curve. For example, edge 1 may be defined as a straight line starting from (x1, y1) and ending at (0, 0). In some embodiments, interface 1200 may also include lines to display measurement information associated with a panel of the selected garment. For example, the interface 1200 may show that a default bust measurement for Shirt 1 is 30 inches. In some embodiments, the interface 1200 may differentiate between edge connections from measurement lines using visual cues. For example, while edge 6 may be displayed as a solid black line connecting points 1212 and 1214, a measurement line between two points may be displayed as a dashed line, indicating that no edge should actually exist between the points.

In some embodiments, a user may view and edit the coordinates of points and edges in visual interface 1200. For example, a user may input "Edge 1" in data field 1232 or select "Edge 1" from a drop-down menu by clicking on button 1234 to view the coordinates and equations associated with edge 1. Coordinate variables 1240A, 1240B, 140C, and 1240D may therefore correspond to the coordinate locations used to define edge 1. In some embodiments, data field 1232, variables 1240A-1240D, and equations 1250A-1250D may automatically populate upon receiving a user selection. For example, if the user clicks on edge 1, field 1232 and equations 1250A-1250D may automatically display the name and equations associated with the selected edge 1. If the user then selects a different edge (e.g., edge 6), visual interface 1200 may update data field 1232 and variables 1250A-1250D to display information specific to edge 6.

In some embodiments, interface 1200 may display additional panels associated with the selected garment. For example, if a dress garment is represented by multiple panel objects in the base digital file, interface 1200 may display a subset, or all, of the panels concurrently alongside panel 1212. In some embodiments, a user may manually select a panel to view from a drop-down menu or may select multiple panels to view at once.

Figure 14:
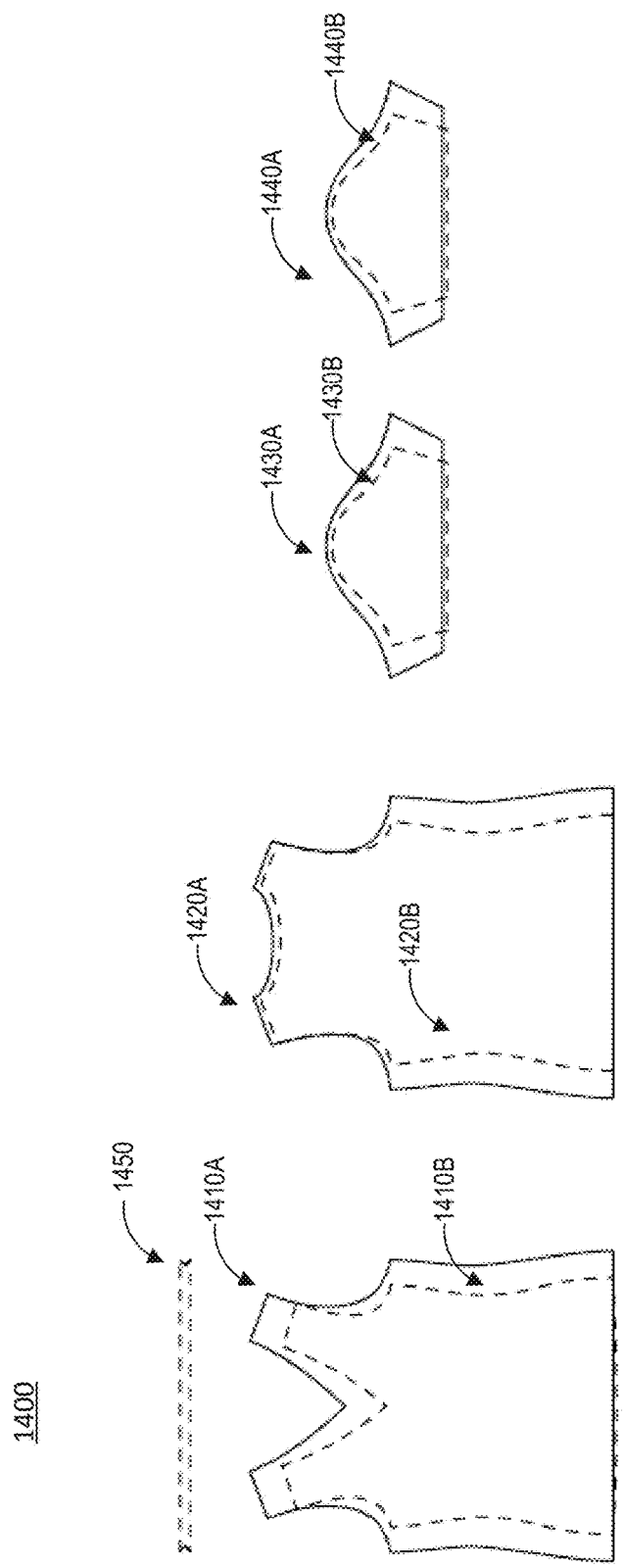
FIG. 14 is a visual representation depicting example scaling of panels utilized in a digital file system to generate a custom garment, according to some embodiments.

FIG. 14 is a visual representation depicting example scaling or other modification of panels utilized in a digital file system to generate custom garments, according to some embodiments. Visual representation 1400 comprises panel objects 1410A, 1420A, 1430A, 1440A, and 1450. Panel objects 1410A-1440A and 1450 depict panel objects represented by a base digital file. Panel objects 1410B, 1420B, 1430B, and 1440B depict panel objects represented by a custom digital file. In some embodiments, panel objects 1410B, 1420B, 1430B, and 1440B may be different sizes compared to their base digital file versions. For example, panel object 1410B represents a smaller panel indicated by a dashed line in comparison to the base panel object 1410A. It will be appreciated that in some embodiments, scaling a garment represented in a base digital file to a custom garment may be based on the custom measurements provided by the user. For example, a user may not successfully reach panel 1410B by shrinking panel 1410A. Rather, in some embodiments, panel object 1410B can only be formed by applying specific equations to each point identified in the base digital file. As shown, the differences between a garment as represented in a base digital file and a corresponding custom garment are not limited to linear scaling factors, but may have point locations that have been defined independently of point locations defined in the base digital file (e.g., by equations that reference a point's position based at least in part on a specific associated body measurement of an individual person, not merely by applying an overall scaling factor selected for a predefined size such as a size "large" shirt). In some embodiments, a custom digital file may not necessarily change the dimensions of a garment represented by a base digital file. For example, panel 1450 has the same dimensions in both the custom and base digital files.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a c system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A digital file system can be or include a microprocessor, but in the alternative, the digital file system can be or include a controller, microcontroller, or state machine, combinations of the same. A digital file system can include electrical circuitry configured to process computer-executable instructions. Although described herein primarily with respect to digital technology, a digital file system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a digital file system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the digital file system such that the digital file system can read information from, and write information to, the storage medium. In the alternative, the storage medium can be integral to the digital file system. The digital file system and the storage medium can reside in an ASIC. The ASIC can reside in a user terminal. In the alternative, the digital file system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a memory storing executable instructions; and
    one or more hardware processors in communication with the memory and configured by the executable instructions to at least:
        generate a first user interface configured to display:
            a base garment associated with a garment type; and
            at least one customization option selectable by a user to modify the base garment;
        receive an indication, based on one or more user selections within the first user interface, that a user is interested in ordering a custom garment, the indication comprising a selection of the garment type and at least one customization option;
        receive one or more user body measurements associated with the user;
        retrieve a base digital file comprising an array of panel objects based at least partly on the selected garment type and the at least one customization option;
        identify points and edges associated with each of at least a subset of the panel objects of the base digital file;
        determine a custom location for each of the identified points based at least partly on one or more equations associated with each point, wherein the one or more equations reference the one or more user body measurements, wherein the one or more equations are retrieved from a data store that stores information associating the one or more equations with the base digital file;
        generate a custom digital file for the custom garment based at least partly on the custom locations for each of the identified points;
        generate a second user interface configured to display:
            a visual representation of the custom garment associated with the custom digital file, wherein the visual representation of the custom garment is rendered in accordance with the at least one customization option; and
            a selectable option to modify the at least one customization option; and
        transmit the custom digital file to a remote computing device for production of a garment corresponding to the custom digital file.

2. The system of claim 1, wherein the one or more hardware processors are further configured to:
    receive an edit to the at least one customization option based at least in part on a user selection of the selectable option in the second user interface;
    retrieve a second base digital file;
    identify points and edges associated with each of at least a subset of panel objects of the second base digital file;
    determine a custom location for each identified point and edge associated with each panel object of the second base digital file based at least partly on one or more equations associated with each point, wherein the one or more equations are based at least partly on the user body measurements; and
    generate a second custom digital file for the custom garment based at least partly on the custom location for each identified point and edge associated with each panel object of the second base digital file.

3. The system of claim 1, wherein the user body measurements are determined based on an automated analysis of a plurality of photos of the user, wherein each of the plurality of photos depicts the user in a different pose.

4. The system of claim 3, wherein a first photo in the plurality of photos is captured by a camera in association with a user interface that displays a live camera view with an overlay depicting a body pose for the user to approximate before the first photo is captured.

5. The system of claim 1, wherein the at least one customization option is selected by the user from a plurality of customization options that are presented to the user based at least partly on the selected garment type.

6. A system comprising:
    a memory storing executable instructions; and
    one or more hardware processors in communication with the memory and configured by the executable instructions to at least:
        receive a request to generate a garment customized to a user, the request comprising a selection of a garment type;
        receive one or more user body measurements associated with the user;
        retrieve a base digital file identifying a plurality of panel objects, wherein the base digital file is selected based at least partly on the garment type in the request;
        identify points and edges associated with each of at least a subset of the panel objects of the base digital file;
        determine a custom location for individual identified points associated with each of the at least a subset of the panel objects based at least partly on one or more equations associated with each point, wherein the one or more equations are based at least partly on the user body measurements, wherein the one or more equations are retrieved from a data store that stores information associating the one or more equations with the base digital file;
        generate a custom digital file for the garment based at least partly on the custom location for each identified point and associated edges;
        transmit the custom digital file to a remote computing device for production of a garment corresponding to the custom digital file.

7. The system of claim 6, wherein the one or more hardware processors are further configured to generate a user interface configured to display a visual representation of the garment associated with the custom digital file, wherein the visual representation of the garment is rendered based at least in part on the custom digital file.

8. The system of claim 7, wherein user interface is further configured to display an option to edit the garment.

9. The system of claim 6, wherein:
    each point of the base digital file is associated with a first coordinate location in a first coordinate system; and
    the custom location for each identified point is associated with a second coordinate location in a second coordinate system.

10. The system of claim 6, wherein the one or more equations are defined by a second user through an equation user interface, wherein the one or more equations are defined prior to receiving the request to generate the garment customized to the user.

11. The system of claim 10, wherein the equation user interface further displays a visual representation of the garment based at least partly on the one or more equations defined by the second user.

12. The system of claim 6, wherein each equation in the one or more equations is associated with the garment type.

13. A method comprising:

receiving a request to generate a garment customized to a user, the request comprising a selection of a garment type;

receiving one or more user body measurements associated with the user;

retrieving a base digital file identifying a plurality of panel objects, wherein the base digital file is selected based at least partly on the garment type in the request;

identifying points and edges associated with each of at least a subset of the panel objects of the base digital file;

determining a custom location for individual identified points associated with each of the at least a subset of the panel objects based at least partly on one or more equations associated with each point, wherein the one or more equations are based at least partly on the user body measurements, wherein the one or more equations are retrieved from a data store that stores information associating the one or more equations with the base digital file;

generating a custom digital file for the garment based at least partly on the custom location for each identified point and associated edges; and transmitting the custom digital file to a remote computing device for production of a garment corresponding to the custom digital file.

14. The method of claim 13, wherein:

each point of the base digital file is associated with a first coordinate location in a first coordinate system; and the custom location for each identified point and edge is associated with a second coordinate location in a second coordinate system.

15. The method of claim 13, wherein the one or more equations are defined by a second user through an equation user interface.

16. The method of claim 15, wherein the equation user interface further displays a visual representation of the garment based at least partly on the one or more equations defined by the second user.

17. The method of claim 13, further comprising generating a user interface configured to display a visual representation of the garment associated with the custom digital file, wherein the visual representation of the garment is generated based at least in part on the custom digital file.

18. The method of claim 17, wherein the visual representation of the garment is generated based at least in part on one or more virtual garment pieces associated with the garment type.

* * * * *